United States Patent Office 3,338,320
Patented Aug. 29, 1967

3,338,320
CLEAR WATER DRILLING FLUID
James R. Gilson, Midland, Mich., and Robert J. Schallenkamp, Concord, Calif., assignors to The Dow Chemical Company, Midland, Mich., a corporation of Delaware
No Drawing. Filed Aug. 3, 1964, Ser. No. 387,236
6 Claims. (Cl. 175—65)

The invention relates to well drilling employing clear water drilling fluid and particularly to the employment of such fluid which is improved by admixture therewith of a friction-loss inhibitor and a flocculation inhibitor.

In the drilling of wells, a drilling fluid is employed for the purpose of carrying the particles of material from the cutting bit as the bit moves through the formation; for the purpose of cooling and lubricating the bit; to provide pressure against sloughing of the borehole wall of the well being drilled; and to provide a coating on the borehole wall which serves as a temporary sealant during the drilling operation. Different types of drilling fluids are employed including high solids drilling fluids usually referred to as muds which are aqueous dispersions of selected clay materials; low solids drilling fluids which contain from about 1 percent to about 6 percent of suspended solids; the so called clear drilling fluids which contain less than 1 percent suspended solids and usually comprise clear water or brine. In some instances, gases e.g. air, is used as a drilling fluid for specific jobs but has inherent disadvantages that limits its broad use. The use of clear water drilling fluids offers certain advantages over the mud type drilling fluid, among which are: greater availability, lower costs, faster drill penetration, more readily and exacting uniformity and consistency, and less wearing on equipment.

However, in drilling well employing clear water drilling fluids it has been observed that turbulence of non-Newtonion liquids, due to their lower viscosity, has resulted in undesirably high energy loss due to the friction within the fluid itself and to the friction between the fluid and the confining walls of the pipes, pumps, and the confined channels through which it passes while performing as a drilling fluid. It is known that if the turbulence of non-Newtonion liquids is lessened by converting the fluid flow to a more nearly laminar flow by admixture therewith of a viscosity improver, the loss of energy is very markedly reduced as indicated by a pronounced lessening in the pressure drop in the fluid being circulated down the well. There is, accordingly, a need for an improved clear water drilling fluid, which exhibits less pressure drop during circulation.

Polyacrylamide having a molecular weight of between about 100,000 and about 3,000,000 and up to about 60 percent of the carboxamide groups hydrolyzed, when admixed in an amount between about 0.001 and about 1.0 percent, based on the weight of the drilling fluid, very desirably lessens the friction loss in the clear water drilling fluid. As the extent of hydrolysis is increased beyond about 40 percent, its effect on solubility in water can usually be noticed. Therefore, the polymer usually employed is that which is hydrolyzed to between about 5 percent and 40 percent.

Solids which are to be removed during drilling must be necessarily suspended in the drilling fluid as the fluid is circulated out of the borehole to a settling tank or pit. In the settling tank or pit, a large proportion of the suspended particles settles and is thereby removed.

We have observed under certain conditions, that the polyacrylamide has a flocculating effect on such particles and thereby interferes with the suspension thereof prior to settling in the settling tank.

We have discovered that such interference with the functioning of the drilling fluid containing polyacrylamide can be effectively inhibited by admixture with such drilling fluid of between about 0.0001 and 1.0 percent, by weight of the drilling fluid, of a water-soluble salt of polymethacrylic acid, e.g. sodium polymethacrylate. This material is commercially available, usually as an aqueous solution of about 25 percent by weight, which is a stable, low-viscosity slightly opalescent solution with little or no tendency to foam when admixed with an aqueous solution of the nature of a clear water drilling fluid.

The preferred amount of the polyacrylamide to employ is between 0.01 and 0.1 percent by weight of the drilling fluid. The preferred amount of the anti-flocculating agent is also between 0.01 and 0.1 percent by weight of the drilling fluid. It is recommended that the polymethacrylate salt and the polyacrylamide be employed in similar quantities, i.e., where higher quantities of polyacrylamide are employed higher quantities of the polymethacrylate be employed.

Methods of preparing both the soluble salts of polymethacrylate and polyacrylamide having a desired molecular weight are well known. The molecular weight may be measured by a number of ways among which is preparing a 0.5 weight percent solution of the polymer in a 4.0 weight percent aqueous sodium chloride solution and ascertaining the resulting viscosity on an Ostwald Viscosimeter at 25° C. One method of ascertaining molecular weight by viscosity measurements is set out in J. Poly. Sci., 1, p. 237 (1946) by Baxendale, Bywater and Evans. A use in the practice of the invention is one showing a viscosity according to the above procedure of between about 8 and 60 centipoises, preferably between about 15 and about 40 centipoises. The sodium salt of polymethacrylic acid commonly employed in the practice of the invention has a molecular weight of between about 8,000 and 10,000.

The invention, accordingly, is carried out by admixing an amount of each of the polyacrylamide and the soluble salt of polymethacrylic acid set out above and proceeding to drill a well, otherwise in accordance with known drilling procedures but employing the thus improved fluid as the drilling fluid in the drilling operation.

A number of advantages ensue as a result of practicing the invention, among which are a marked reduction in friction loss which in turn is reflected in reduced horsepower requirements to maintain a given drilling fluid circulation rate; an extended life of the clear water drilling fluid; a greater fluid flow velocity at a given horsepower so that a greater depth of penetration is possible with a given system; a lubrication effect on the drill collars accompanied by less tendency for binding of drill strings and less likelihood of stuck pipes during drilling operations; a higher jet velocity at the bit; extended bit life; and faster drill penetration in many instances.

In a preferred embodiment of the invention, the residual mud in the wellbore already formed is flushed out, prior to employing the polyacrylamide and salt of polymethacrylate according to the invention, preferably by employing some sodium carbonate in the flush water, which reduces the calcium ion concentration of any residual mud. Sufficient sodium carbonate is employed to remove substantially all the calcium ions that are indicated to be present. The soluble salt of the polymethacrylic acid, usually the sodium salt, is then admixed with the clear water drilling fluid, e.g. to the suction tank or pit, in an amount usually conveniently calculated to be between about 5 and 50 parts thereof, per million parts by weight of the drilling fluid, and thereafter between about 0.5 and 10.0 pounds of the polyacrylamide per thousand gallons of the drilling fluid. Drilling is then continued in conventional manner in other respects. Maintaining the circulation rates relatively high has been found to give best results. It is advisable, as drilling progresses, to make periodic checks of each of the sodium polymethacrylate, accumulated earthen particles, calcium ion concentration, and polyacrylamide concentration. Modifications can be made, accordingly, in the composition of the drilling fluid. It has been found that the pressure drop due to turbulent flow, disregarding the drop caused by passage of the drilling fluid through the bit openings, has been reduced by the practice of the invention by as much as 70 to 80 percent. For example, in a drilling operation where total pump pressure was 1500 p.s.i., it is estimated that 60 percent of this is used to force the fluid through the openings in the bit (leaving 40 percent of the required circulating pressure to be due to friction in the fluid as it passes through the drill string and up the annulus). The pressure drop due to the latter has been reduced in piping to a value only 25 percent of that existing without the presence of the polyacrylamide and the sodium methacrylate used in accordance with the invention.

The following field experiment illustrates the use of polyacrylamide without the aid of the deflocculant polymethacrylate salt.

In the University Waddell lease in the West Texas area, a well was being drilled employing clear water drilling fluid. Drilling had reached a depth of 6400 feet and was progressing at the rate of one foot in seven minutes. The pump pressure was 2850 pounds per square inch gauge (p.s.i.g.) at the wellhead. The circulation rate was 9 barrels per minute. It was calculated that 2300 pounds per square inch of pressure were necessary to force the fluid through the bit openings. This unusually high resistance (due to the especially high rate of circulation), not being due to turbulence, is not available for reduction in accordance with the practice of the invention.

By the addition of 2 pounds of polyacrylamide per 1000 gallons of drilling fluid, the pressure requirement dropped almost immediately to 2600 p.s.i.g., a 250 p.s.i.g. drop. This, it will be observed, is a drop of half the pressure necessary to overcome resistance in the lines due to turbulence.

However, the polyacrylamide showed undesirable flocculating effects on suspended soil particles and its use alone was not fully satisfactory.

The following examples illustrate the practice of the invention.

*Example 1*

A well was being drilled in Andrews County, Tex., employing clear water drilling fluid. Drilling had reached about 7100 feet. The pressure of the drilling fluid, measured at the wellhead was 2525 p.s.i.g. There was a concentration of 240 parts per million of calcium ions in the drilling fluid. The total volume of drilling fluid volume was about 50,000 gallons. The fluid was circulated into two earthen pits and one metal suction tank. The flow rate of the fluid was maintained at 306 gallons per minute by means of a National G-700 Duplex pump. An 8¾" Hughes Tool Co. jet bit was employed, equipped with three jets: a $\frac{5}{16}$" and two $\frac{9}{32}$" jets. The hole was provided with 9⅝" surface casing to a depth of 2000 feet. About one barrel of conventional drilling soap was added each day to the suction tank.

It can be readily observed that this system was of rather large volume and provided a relatively low flow rate.

The treatment, in accordance with one mode of practicing the invention, proceeded as follows:

Two pounds of soda ash per 1000 gallons of drilling fluid (to reduce the calcium ion concentration) were admixed therewith. Thereafter 0.1 gallon of a 25% by weight aqueous solution of sodium polymethacrylate and two pounds of polyacrylamide per 1000 gallons of clear water drilling fluid were admixed therewith by independent addition thereof in the suction tank at about five-minute intervals until about 100 pounds of soda ash, 5 gallons of the 25% aqueous solution of sodium polymethacrylate, and 100 pounds of polyacrylamide, in all, had been added. The 25% aqueous solution of sodium polymethacrylate was obtained from Dewey and Almy, a division of the W. R. Grace & Company, Cambridge, Mass. The pressure at the wellhead, while adequate circulation continued, lessened to 2125 p.s.i.g., a drop of 400 pounds.

Observation indicated that pressure drop due to friction through the bit openings in this treatment was unusually high. It was estimated that only about 700 p.s.i.g. of the 2500 p.s.i.g. were due to turbulence in the lines. A reduction in pressure of 400 p.s.i.g., therefore, is about 57% of the reduction available. In other words, the percent reduction in pressure is 57% based on that available for reduction by converting turbulent flow into substantially laminar flow.

Thereafter, without further addition of treating materials, although water was added as make-up to the drilling fluid, the pressure for adequate circulation did not reach 2300 p.s.i.g. There was no build-up of solids and no acquisition of a murky appearance due to additionally dissolved or dispersed matter. Although undesirable flocculation in the drilling fluid in the wellbore was substantially eliminated, the drilling fluid continued, without apparent change to provide adequate settling of solids in the settling tank.

*Example 2*

A well in the vicinity of Boundary Lake, British Columbia, Canada, was being drilled employing clear water drilling fluid. 3½" drill pipe was employed. The system was estimated to require 12,500 gallons of fluid. Pump pressure was 1450 p.s.i.g. at 42 strokes/minute. Drilling was at 698 feet. The density of the fluid was 8.5 pounds per gallon. The rate of circulation was 178 gallons per minute. The drilling bit employed was a 6¾" Hughes, equipped with three $\frac{5}{16}$" jets. Conventional suction tank and sump pits were used.

The treatment according to the invention was as follows:

50 pounds of soda ash followed by 2 gallons of a 25% by weight aqueous solution of the sodium salt of polymethacrylic acid were added to the drilling fluid in the suction tank. 50 pounds of polyacrylamide were then admixed with 15 gallons of isopropyl alcohol (the isopropyl alcohol being employed to aid the dispersion of the polyacrylamide particles in the aqueous drilling fluid) and the resulting slurry added to the suction tank. The addition of the soda ash and polyacrylate salt, in 50-pound and 2-gallon additions followed by 50-pound additions of the polyacrylamide was repeated, four times over a period of about six hours making a total addition of 200 pounds of soda ash, 8 gallons of the 25% polymethacrylate aqueous solution, and 200 pounds of polyacrylamide to the drilling fluid. Water was added at intervals to maintain desired volume of drilling fluid due to normal fluid loss to the formation.

The pressure required for adequate circulation of the drilling fluid at the depth being drilled (which had reached 1111 feet) after 8 hours following addition of the first materials above, in accordance with the invention, based upon the drilling experience prior to the addition would have been 1380 p.s.i.g. The necessary pressure, however, was only 975 p.s.i.g. This represents about 30% overall reduction. Since the necessary pressure to force the drilling fluid through the openings in the bit remains substantially unaffected, it is clear that a very appreciable reduction in necessary pressure for movement through the pipes was brought about by the practice of the invention.

The fluid was examined at this time (8 hours after the addition of the first materials used in the treatment of the invention). More than 12 pounds of polyacrylamide per 1000 gallons was shown to be present. The volume of fluid was calculated to be 23,000 gallons. (Water had been added at intervals to maintain the desired volume of fluid.) The density of the fluid was 8.9 pounds/gallon. The drilling depth at this time was 1297 feet. The fluid had an excellent appearance, contained an unusually small percent of suspended formation solids, was desirably slick to the feel, and was showing improved resistance to fluid loss to the formation.

Thereafter, at intervals over the succeeding 36 hours, 50 pounds of polyacrylamide and a gallon of the 25% by weight aqueous solution of the sodium polyacrylate salt, and occasionally additional soda ash (in 25 pound lots) were added to the suction tank.

At that time the pressure required at the wellhead was 1300 p.s.i.g. The drilling fluid showed 0.7 to 0.8 pounds of polyacrylamide/1000 gallons of fluid. Drilling was then at the 2980 foot level.

The total amounts of the materials added according to the practice of the invention were: 300 pounds of soda ash, 5 gallons of 25% aqueous solution of sodium polymethacrylate salt and 250 pounds of polyacrylamide.

No more materials were added thereafter, but drilling was continued. (Water was added at intervals to maintain the desired volume of fluid.) After an additional 36 hours of drilling, further examination showed the drilling pressure to have risen to 1575 p.s.i.g. The drilling depth at that time was 3650 feet. This rise in pressure was a result of the increase in depth and the diminishment of the polyacrylamide concentration to less than 0.1 pound/1000 gallons.

A review of the treatment and a comparison to other drilling operations in the area showed the following facts:

During drilling there was less drag on the rotating bit; the rotational speed of the bit increased, at no increase in power; drilling time decreased, although trouble was encountered (unrelated to the invention) by plugging of some of the jets with pieces of wood. The entire drilling job required 8 days, which was 3 days less than that usually required for other holes drilled to the same depth in the same formation. It actually had required the least drilling time of any hole in the field up to that time of which there had been several dozens previously drilled in the field.

Having described our invention what we claim and desire to protect by Letters Patent is:

1. In a method of drilling a well into a subterranean formation employing a power-driven cutting bit and a clear water drilling fluid, the improvement which consists essentially of admixing with said drilling fluid between 0.0001 and 1.0 percent of a water-soluble salt of polymethacrylic acid and between 0.001 and 1.0 percent of water-soluble polyacrylamide, having a molecular weight of between about 100,000 and 3,000,000 containing up to 60% of the carboxamide groups hydrolyzed, and circulating the resulting so-treated drilling fluid down the wellbore, through the bit, and up to the earth's surface.

2. The method according to claim 1 wherein residual earthen particles in the wellbore are first flushed out with an aqueous sodium carbonate solution prior to circulating the clear water drilling fluid containing the polymethacrylate salt and the polyacrylamide.

3. The method according to claim 1 wherein the soluble salt of polymethacrylic acid is the sodium salt.

4. The method according to claim 1 wherein the polyacrylamide employed is hydrolyzed to between about 5 and about 40 percent.

5. The method according to claim 1 wherein the amount of the salt of polymethacrylic acid is between 0.01 and 0.1 percent and the amount of the polyacrylamide is between 0.01 and 0.1, by weight of the drilling fluid.

6. The method according to claim 1 wherein sodium carbonate is periodically admixed with the drilling fluid during the drilling operation and is present therein with the salt of polymethacrylic acid and polyacrylamide.

References Cited
UNITED STATES PATENTS
| | | | |
|---|---|---|---|
| 2,718,497 | 9/1955 | Oldman et al. | 252—8.5 |
| 3,120,548 | 9/1963 | Smith et al. | 137—13 |
| 3,230,919 | 1/1966 | Crawford | 137—13 |

FOREIGN PATENTS
| | | |
|---|---|---|
| 725,460 | 3/1955 | Great Britain. |

CHARLES E. O'CONNELL, *Primary Examiner.*
JAMES A. LEPPINK, *Examiner.*